United States Patent
Vicente et al.

(10) Patent No.: US 8,972,713 B2
(45) Date of Patent: Mar. 3, 2015

(54) CLOUD TRANSFORMABLE DEVICE

(71) Applicant: Intel Corporation, Santa Clara, CA (US)

(72) Inventors: John B. Vicente, Roseville, CA (US); Hong C. Li, El Dorado Hills, CA (US); Mark D. Yarvis, Portland, OR (US); James R. Blakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 13/723,871

(22) Filed: Dec. 21, 2012

(65) Prior Publication Data

US 2014/0181489 A1    Jun. 26, 2014

(51) Int. Cl.
*G06F 9/00* (2006.01)
*G06F 15/177* (2006.01)
*G06F 9/455* (2006.01)

(52) U.S. Cl.
CPC .................................. *G06F 9/45558* (2013.01)
USPC ............................. 713/100; 713/1; 718/104

(58) Field of Classification Search
CPC .............. G06F 15/7867; G06F 9/4416; G06F 9/45558; G06F 9/50
USPC ....................... 713/1, 2, 100; 712/15; 718/104
See application file for complete search history.

(56) References Cited

U.S. PATENT DOCUMENTS

| 6,539,438 | B1 * | 3/2003 | Ledzius et al. ........... 710/8 |
| 7,030,647 | B1 * | 4/2006 | White et al. ............. 326/38 |
| 7,146,598 | B2 * | 12/2006 | Horanzy ................. 716/128 |
| 2010/0070970 | A1 * | 3/2010 | Hu et al. ................ 718/1 |
| 2010/0146257 | A1 * | 6/2010 | Yamamoto ............... 713/100 |

OTHER PUBLICATIONS

"Cloud computing," Wikipedia, The Free Encyclopedia, retrieved from: <http://en.wikipedia.org/w/index.php?title=Cloud_computing&oldid=510626888>, edited Sep. 3, 2012, 12 pages.
"Virtualization," Wikipedia, The Free Encyclopedia, retrieved from: <http://en.wikipedia.org/w/index.php?title=Virtualization&oldid=510042806>, edited Aug. 31, 2012, 6 pages.

* cited by examiner

*Primary Examiner* — Mark Connolly
(74) *Attorney, Agent, or Firm* — Barnes & Thornburg LLP

(57) ABSTRACT

Technologies for performing a platform transformation on a computing device include transforming a transformable component of the computing device from a first hardware configuration in which a first set of hardware features is enabled to a second hardware configuration in which different hardware features are enabled. The computing device has a first capability when in the first configuration and a different capability when in the second configuration. In performing the platform transformation, the computing device determines a platform transformation build, establishes a communication connection with a cloud-based platform transformation service, and identifies and retrieves relevant platform definitions from the cloud-based platform transformation service. The platform definitions are used in effecting the desired platform transformation.

20 Claims, 6 Drawing Sheets

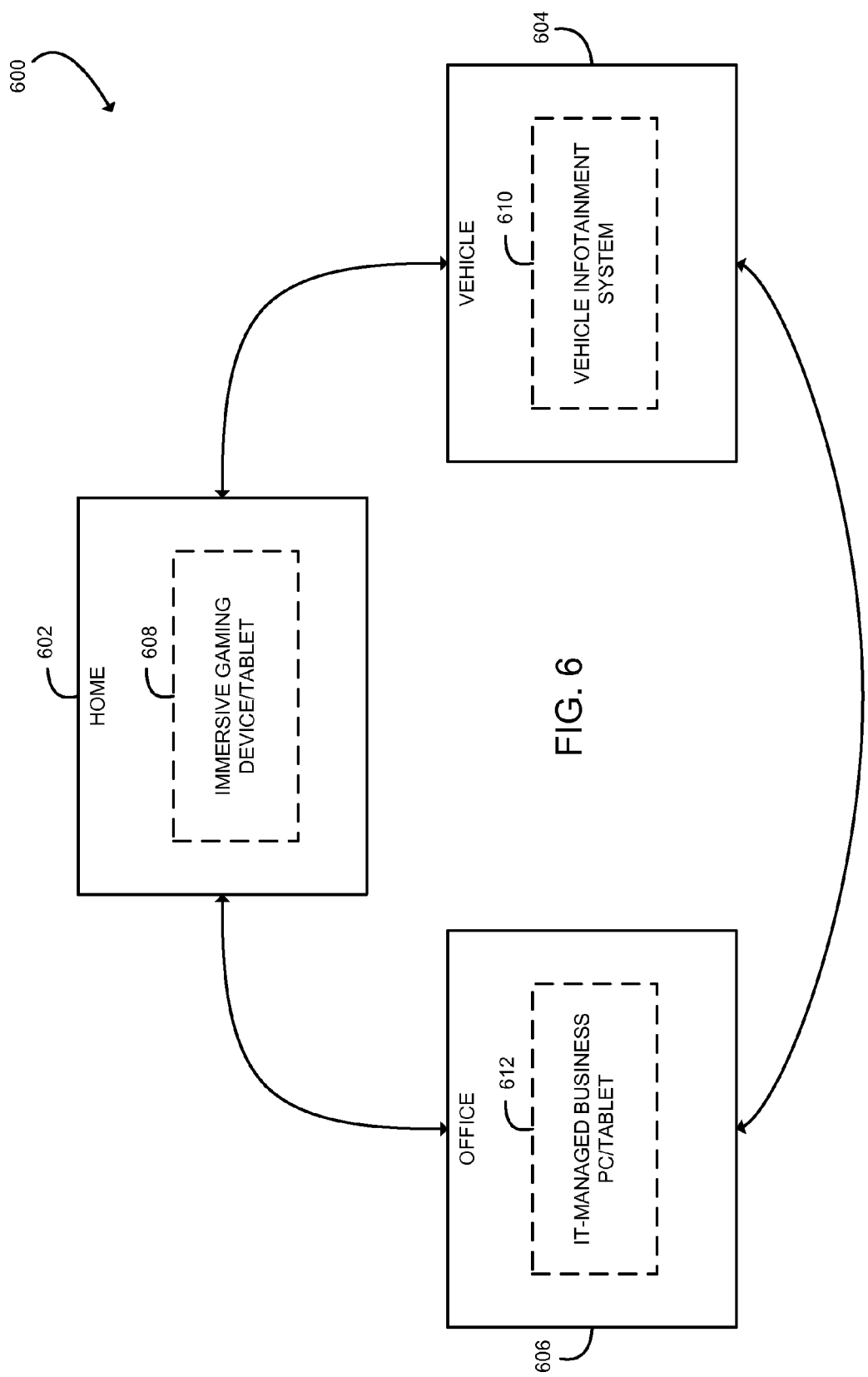

CLOUD TRANSFORMABLE DEVICE

BACKGROUND

There are established markets for both purpose-built and generalized computing platforms. Advances in software have essentially replaced the use of several physical devices such as calculators, compasses, phones, and audio players. Today, many people instead use a single digital device such as a smart phone or tablet computer to perform many of the functions formerly reserved for separate physical devices via software applications. However, such digital devices are still largely fixed in form and function with static preconfigured resources, capabilities, and workspace.

Virtualization solutions permit a single computing device to take on multiple environments using the same physical device by implementing, for example, abstraction techniques. However, virtualization solutions are not power-efficient and have performance constraints, which are issues of particular concern in mobile computing device implementations. Further, virtualization is, by its very nature, limited in its ability to be context aware.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a simplified block diagram of at least one embodiment of dynamically changing a platform of a computing device of the system of FIG. 1 as the computing device moves between different physical environments.

DETAILED DESCRIPTION OF THE DRAWINGS

Figure 1:
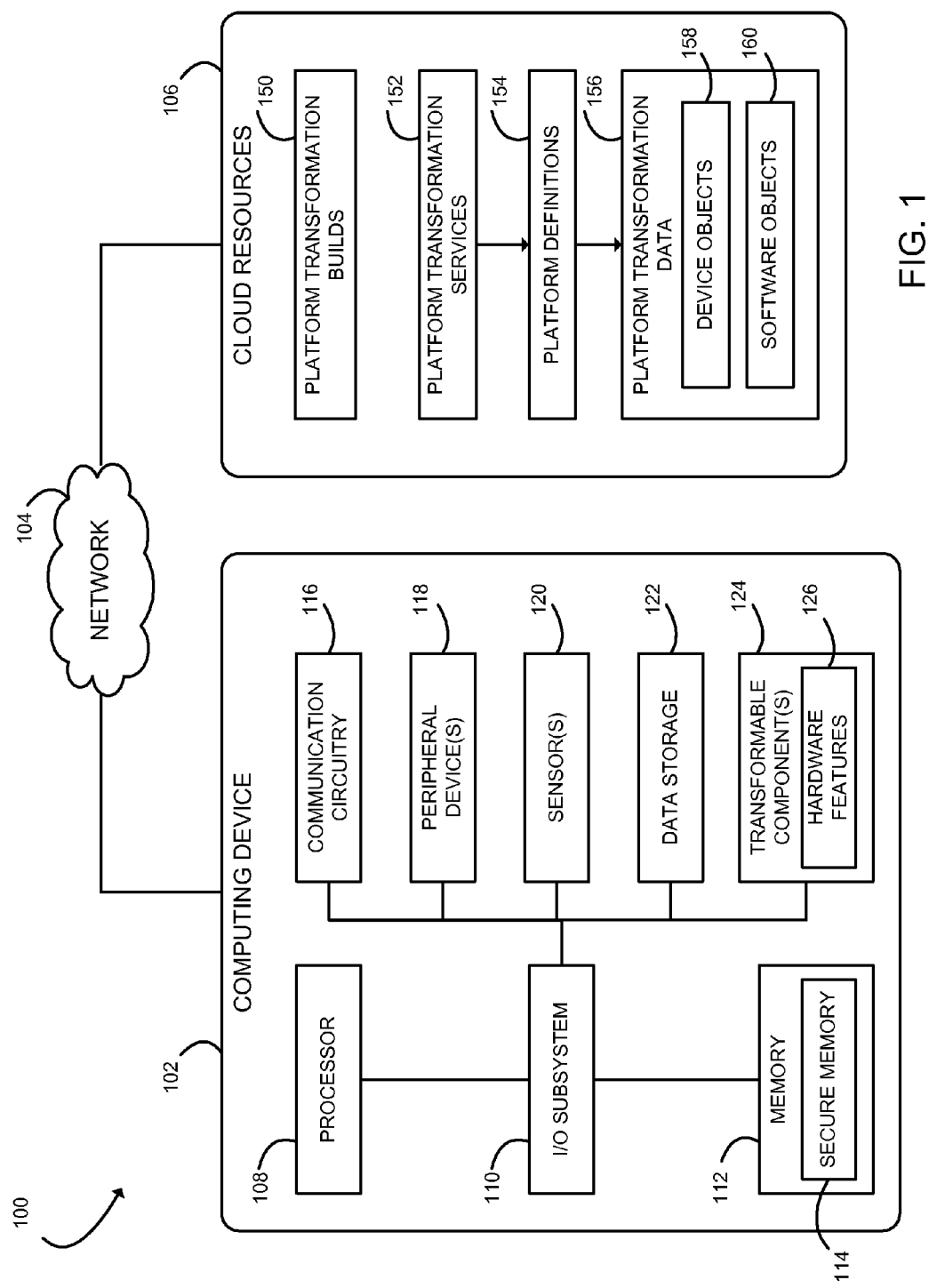
FIG. 1 is a simplified block diagram of at least one embodiment of a system for performing a platform transformation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for performing a platform transformation includes a computing device 102, a network 104, and cloud resources 106. In use, as discussed in more detail below, the computing device 102 may access the cloud resources 106 over the network 104 to transform the platform of the computing device 102. Such platform transformations may, for example, transform the computing device 102 from one type of computing device (e.g., tablet computer) to another type of computing device (e.g., home router) and/or upgrade or downgrade the capabilities (e.g., audio quality, video quality, memory size, processor functionalities, etc.) of the computing device 102 as discussed in more detail below. Although only one computing device 102, one network 104, and one cloud resources 106 are illustratively shown in FIG. 1, the system 100 may include any number of computing devices 102, networks 104, and cloud resources 106. For example, the cloud resources 106 may be distributed across several computing devices and/or databases.

The computing device 102 may be embodied as any type of computing device capable of performing a platform transformation and performing the functions described herein. For example, the computing device 100 may be embodied as a mobile phone, a smart phone, a tablet computing device, a personal digital assistant, a messaging device, a consumer electronic device, a handset, a laptop computer, a desktop computer, a server, and/or any other computing/communication device. As shown in FIG. 1, the illustrative computing device 102 includes a processor 108, an input/output ("I/O") subsystem 110, a memory 112, a communication circuitry 116, one or more peripheral devices 118, one or more sensors 120, data storage 122, and one or more transformable components 124. Of course, the computing device 102 may include other or additional components, such as those commonly found in a computing device (e.g., various input/output devices), in other embodiments. Additionally, in some embodiments, one or more of the illustrative components may be incorporated in, or otherwise from a portion of, another component. For example, the memory 112, or portions thereof, may be incorporated in the processor 108 in some embodiments.

The processor 108 may be embodied as any type of processor capable of performing the functions described herein. For example, the processor 108 may be embodied as a single or multi-core processor(s), digital signal processor, microcontroller, or other processor or processing/controlling circuit. Similarly, the memory 112 may be embodied as any type of volatile or non-volatile memory or data storage capable of performing the functions described herein. In operation, the memory 112 may store various data and software used during operation of the computing device 102 such as operating systems, applications, programs, libraries, and drivers. The memory 112 is communicatively coupled to the processor 108 via the I/O subsystem 110, which may be embodied as circuitry and/or components to facilitate input/output operations with the processor 108, the memory 112, and other components of the computing device 102. For example, the I/O subsystem 110 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 110 may form a portion of a system-on-a-chip (SoC) and be incorporated, along with the processor 108, the memory 112, and other components of the computing device 102, on a single integrated circuit chip. In some embodiments, the memory 112 may include a portion of secure memory 114 to, for example, store data associated with authorized platform transformation builds and/or build capabilities of the transformable platform as discussed below. In another embodiment, the secure memory may store one or more cryptographic keys for secure communication. In various embodiments, the secure memory 114 may be separate from the memory 112 and/or a secure partition of the memory 112.

The communication circuitry 116 of the computing device 102 may be embodied as any communication circuit, device, or collection thereof, capable of enabling communications between the computing device 102 and other remote devices (e.g., devices within the cloud resources 106) over the network 104. The communication circuitry 116 may be configured to use any one or more communication technology (e.g., wireless or wired communications) and associated protocols to effect such communication.

The peripheral devices 118 of the computing device 102 may include any number of additional peripheral or interface devices. The particular devices included in the peripheral devices 118 may depend on, for example, the intended use of the computing device 102. The sensors 120 may include, for example, inertial sensors, proximity sensors, optical sensors, light sensors, audio sensors, temperature sensors, motion sensors, and/or other types of sensors. In some embodiments, the sensors 120 may be used to determine a physical context of the computing device 102 at a particular point in time (e.g. the current location of the computing device 102, the current user of the computing device 102, the current state of communication of the computing device 102 with other devices, whether the computing device 102 is in motion, etc.). The data storage 122 may be embodied as any type of device or devices configured for short-term or long-term storage of data such as, for example, memory devices and circuits, memory cards, hard disk drives, solid-state drives, or other data storage devices.

The transformable components 124 may be embodied as one or more devices capable of being transformed from one configuration that provides a particular capability to the computing device 102 to one or more other configurations that each provide other capabilities to the computing device 102. To do so, in the illustrative embodiment, the transformable components 124 include one or more hardware features 126. Such hardware features 126 may include any type of internal or external hardware structure that may be modified, enabled/disabled, reprogrammed, or otherwise reconfigured from one function or purpose to another. For example, the hardware features 126 may be embodied as external input/output pins of a chipset, processor, or other electrical component or circuit. Such chipset, processor, or other electrical component or circuit may include a mechanism (e.g., a firmware mechanism) to reconfigure the input/output pints to perform a different function and/or serve a different purpose. For example, the transformable component 124 may be transformed to change a group of output ports to input ports (or vise-versa), change a logic level of a pin, and/or otherwise modify the functionality of one or more input/output pins or other external structure. Additionally or alternatively, the hardware features 126 may be embodied as internal structures, such as reconfigurable logical interconnects, that may be reconfigured or modified to change the function or purpose of the transformable component 124. For example, the transformable components 124 may include a field-programmable gate array (FPGA) or other reconfigurable electrical component in which the internal logical interconnects, structure, and logical components may be modified to alter the functionality of the transformable component and/or input/output therefrom.

As such, it should be appreciated that the transformable components 124 are capable of being transformed from one configuration to another to provide new or different capabilities to the computing device 102. In this way, the type of device, purpose, and/or functionality of the computing device 102 may be transformed, reconfigured, or otherwise changed. For example, a first set of the hardware features 126 may be enabled or otherwise configured to transform a transformable component 124 of the computing device 102 into a first configuration in which the transformable component 124 has a first functionality or capability. Alternatively, a second set of the hardware features 126, which may be a subset of the first set, may be enabled or otherwise configured to transform the transformable component into a second configuration in which the transformable component 124 has a second functionality or capability that is different from the first functionality/capability. As such, the purpose or type of the computing device 102 at any point in time may be defined by the functionality/capability of the transformable component 124.

In the illustrative embodiment, each of the transformable components 124 is embodied as a separate component of the computing device 102. However, although shown as a separate component in FIG. 1, it should be appreciated that a transformable component 124 may be embodied as one or more of the processor 108, the I/O subsystem 110, the memory 112, the communication circuitry 116, the peripheral devices 118, the sensors 120, the data storage 122, and other elements of the computing device 102.

The network 104 may be embodied as any number of various wired and/or wireless communication networks. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), or any combination thereof.

The cloud resources 106 may be embodied as any computing device or collection of computing devices capable of communicating with the computing device 102 over the network 104 and performing the functions described herein. It should be appreciated that, in some embodiments, the cloud resources 106 may be distributed and/or duplicated across multiple computing devices. The illustrative cloud resources 106 include platform transformation builds 150, platform transformation services 152, platform definitions 154, and platform transformation data 156. Of course, it should be appreciated that the cloud resources 106 may include other components, sub-components, data, and devices such as those commonly found in a computing device or resources associated with a cloud computing environment, which are not illustrated in FIG. 1 for clarity of the description. Additionally, in some embodiments, on or more of the illustrative components may be incorporated in, or otherwise form a portion of, another component.

In the illustrative embodiment, the platform transformation builds 150 define and/or identify particular capabilities and any platform definitions 154 required to achieve the corresponding capabilities. For example, one platform transformation build 150 may be associated with a high-end gaming computer. As such, that platform transformation build 150 may be defined such that high-definition (HD) audio and HD video are required, among other capabilities, and as such, identify the platform definitions 154 associated with HD audio and HD video. That is, in some embodiments, the platform transformation builds 150 may identify one or more platform definitions 154 that are required to transform the current platform of the computing device 102 into the desired platform to achieve the desired capabilities. For example, in an embodiment, the cloud resources 106 may include platform transformation builds 150 associated with one or more of a gaming computer, a business computer, a tablet computer, a router hub, a server, a device with multiple operating systems, a digital picture frame, and other devices. The level of abstraction and/or granularity of the platform transformation builds 150 may differ in various embodiments. For example, in some embodiments, some platform transformation builds 150 may be directed to low level features and/or components of the computing device 102, whereas other platform transformation builds 150 may be directed to high level features and/or components in other embodiments.

The platform transformation services 152 may include any cloud-based services capable of facilitating the transformation of the platform of the computing device 102. The platform definitions 154 may define or otherwise identify, for example, the platform transformation data 156 associated with the platform definitions 154 (e.g., one or more software and/or device objects). For example, the platform definitions 154 may include video device, audio device, storage device, operating system data or objects, and/or other data useable to transform the platform of the computing device 102. Similar to the platform transformation builds 150, the granularity and level of abstraction of the platform definitions 154 may vary depending on the embodiment. As indicated above, the platform transformation data 156 may include one or more software objects 160 (e.g., user profile, applications, operating systems, etc.) and/or device objects 158 (e.g., WiFi®, video, audio, storage, etc.). The software objects 160 may be embodied as, or otherwise include, any type of software/firmware usable to facilitate the transformation of the platform of the computing device 102 including, but not limited to, application software, operating system software, device firmware, drivers, and/or other software and/or firmware. Similarly, the device objects 158 may be embodied as any type of data usable to configure a device of the computing device 102 (e.g., the one or more transformable components 124). In some embodiments, the platform transformation data 156 (i.e., the software objects 160 and the device objects 158) may include data usable to alter the functionality of the transformable components 124 (i.e., by transforming the transformable component 124 from a first hardware configuration to a second hardware configuration). As such, the platform of the computing device 102 may be transformed or modified by transforming the transformable component(s) 124 using the device objects 158 and, in some cases, updating or modifying software and/or firmware of the computing device 102 (e.g., firmware associated with the transformable component(s) 124) using the software objects 160. It should be appreciated that in some embodiments, the platform transformation builds 150 may directly identify the relevant platform transformation data 156.

The system 100 may be used in different embodiments for an array of different purposes as discussed in detail below. In some embodiments, device manufacturers and retailers may use the system 100 to offer a myriad of platforms (e.g., a work computer, an entry level gaming computer, a high-end gaming computer, a digital display, etc.) with only a limited number of product models of the computing devices 102. For example, a device retailer may offer an economy model, a standard model, and an all-inclusive model of the computing devices 102. In such an embodiment, the all-inclusive model may include hardware features including, for example, the required transformable components 124 to enable the computing device 102 to transform its platform into any platform made available by the device retailer. The economy line may include very limited hardware features enabling only minimal (if any) platform transformations of the computing device 102. Further, the standard model may include hardware features that enable the computing device 102 to transform its platform into a subset of platforms offered by the device retailer (e.g., more than the economy model but less than the all-inclusive model). Additionally, the device retailer may separately offer the various platforms. As such, in such an embodiment, a user may decide to purchase the all-inclusive model of the computing device 102, which gives the user all of the hardware features necessary to transform into any available platform, but only purchase one or two platforms (i.e., the user's authorized platforms). That scheme would enable the user to transform between those one or two platforms (e.g., a work computer and a high-end gaming computer) with the computing device 102 and purchase additional platforms at a later point in time. In some embodiments, functionalities and/or components of the computing device 102 may be enabled or disabled based on the platform definitions 154 and/or the user's platform authorizations. Of course, in other embodiments, the transformations of the computing device 102 may be selected, or otherwise controlled, directly by the user of the computing device 102 without interaction by any retailer or device manufacturer.

In another embodiment, the system 100 may be used to allow a user to transform her current computing device 102 into a different computing device 102 but without repurchasing the hardware of the computing device 102. That is, by transforming the platform of her current computing device 102, the user may transform the computing device 102 from a device of a first type (or a device having a first purpose) to a device of a different type (or a device having a different purpose). For example, the user may have been a computer engineer for five years and recently transitioned exclusively into a management role at her company. In such a situation, the system 100 may be used to transform the platform of the computing device 102 from a device configured for engineering and programming, which may include various software development suites and programming-specific hardware and/or peripheral devices, into a device directed to business management. The new business management device may include, for example, accounting and desktop publishing software suites. The new device may also include hardware features and/or peripheral devices directed to business management. For example, in an embodiment, a transformable digital signal processor of the engineering and programming device may be reconfigured for useful operation in a business management device. As such, it should be appreciated that software may be installed or otherwise modified on the computing device 102 concurrent with the reconfiguration of the hardware of the computing device 102. Of course more substantial changes to the type of the computing device 102 may be implemented. For example, the computer device 102 may be transformed from a mobile computing device to a router, a digital picture frame, a personal digital assistant, or other computing device.

In another embodiment, the system 100 may be used to upgrade the computing device 102 to include additional features and/or functionality. In some embodiments, as discussed below, the platform transformation may be more granular. For example, a standard audio devices may be transformed to an HD audio device or an inexpensive webcam may be transformed into an HD webcam. In some embodiments, the processor 108, the memory 112, and/or the data storage 122 (e.g., hard drive) may be upgraded. For example, in one embodiment, the processor 108 may be transformed to distribute processing to remote devices (e.g., the cloud resources 106) or to have an increase speed, more memory, etc.

In yet another embodiment, the system 100 may be used for dynamic transformation from one platform to another in response to some condition being satisfied. For example, the user may specify (e.g., via a graphical user interface) that the computing device 102 should be transformed from one platform in one location to another platform in another location. For example, in the illustrative embodiment of FIG. 6, the computing device 102 is portable and may be transported between various physical environments. Specifically, the computing device 102 may be, at any given point in time, at a user's home 602, in a user's vehicle 604, or at a user's office 606. In the illustrative embodiment, the computing device 102 is transformed into a vehicle infotainment system 610 when the user enters his vehicle 604, for example, on his way to work. When the user gets to work and enters his office 606, the computing device 102 may be transformed into an IT-managed business PC/tablet 612 so that the user may begin his work. Upon returning home 602, the computing device 102 may transform into an immersive gaming device/tablet or an educational media tablet 608 for the user to enjoy personal recreational computing with friends and family. It should be appreciated that the system 100 enables a user to use a single computing device 102 for multiple functions and reduces the need to have a different hardware device for each computing task. Of course, it should be understood that the illustrative embodiment of FIG. 6 is not intended to be limiting and is provided merely for illustrative purposes. For example, in other embodiments, the computing device 102 may be transformed from one platform to another platform, for example, in response to a change in any relevant context (e.g., a change in time, user activity, security, environment, etc.) of the computing device 102 as discussed in detail herein.

Figure 2:
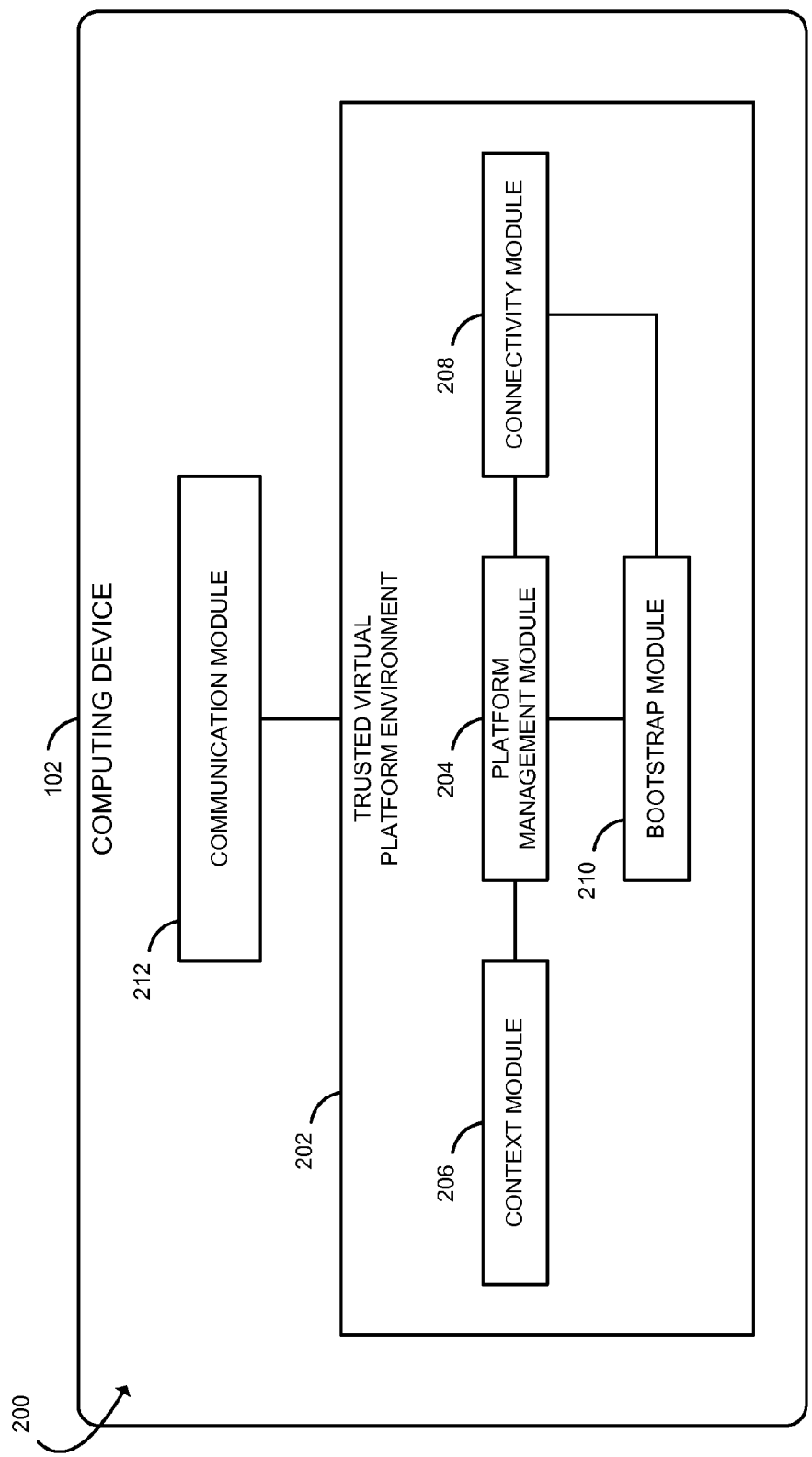
FIG. 2 is a simplified block diagram of at least one embodiment of an environment of a computing device of the system of FIG. 1.

Referring now to FIG. 2, in use, the computing device 102 may establish an environment 200 for transforming the platform of the computing device 102. The environment 200 in the illustrative embodiment includes a trusted virtual platform environment 202 and a communication module 212. Further, the trusted virtual platform environment 202 includes a platform management module 204, a context module 206, a connectivity module 208, and a bootstrap module 210.

The trusted virtual platform environment 202 may be used to transform the computing device 102 from one platform to another platform. In some embodiments, the transformation may take place "on the fly." Further, in some embodiments, the trusted virtual platform environment 202 may verify (e.g., through hardware) that a platform transformation build is secure. In doing so, the trusted virtual platform environment 202 may utilize, for example, a manageability engine (ME), security co-processor, and/or trusted platform module (TPM) of the computing device 102. Further, the trusted virtual platform environment 202 may employ one or more suitable cryptographic, attestation, or other security mechanisms to ensure the security of the platform transformation build.

As discussed below, the platform management module 204 may manage the platform transformation build. In some embodiments, the platform management module 204 may receive a request from a user of the computing device 102 to transform the computing device 102 from the current platform to another platform. In other embodiments, the platform management module 204 may receive data from the context module 206 indicating that a platform transformation condition has been satisfied. In such an embodiment, the platform management module 204 may use that data to identify an appropriate platform transformation build. In other embodiments, the context module 206 may determine the appropriate platform transformation build. As such, in some embodiments, the platform management module 204 may strictly serve a data management and information handling role (e.g., as a data relay). In the illustrative embodiment, the platform management module 204 may communicate with each of the context module 206, the connectivity module 208, and the bootstrap module 210 to facilitate the platform transformation.

The context module 206 may determine the context of the computing device 102 at a particular point in time. For example, in some embodiments, the context module 206 has platform awareness and introspection capabilities, such that the context module 206 is able to identify the hardware, software, and/or firmware architecture of the computing device 102 and the current platform of the computing device 102. In another embodiment, the context module 206 may utilize the outputs of the sensors 120 to determine the context of the surrounding physical environment of the computing device 102. For example, in one embodiment, the context module 206 may determine the geographical location of the computing device 102. In another example, the context module 206 may determine whether the computing device 102 has been picked up, set down, moved, or otherwise repositioned by the user and/or other user-related contextual information.

The connectivity module 208 may establish a communication connection with a cloud-based platform transformation service (e.g., within the cloud resources 106) and determine the platform definitions 154 that are required by the computing device 102 to perform a selected (e.g., selected by a user or determined dynamically) platform transformation build. As discussed above, the platform definitions 154 may identify, or otherwise include, the platform transformation data 156. As such, in some embodiments, the connectivity modules 208 identifies the required platform transformation data 156 to perform the platform transformation (e.g., from the platform definitions 154) and retrieves that platform transformation data 156. In some embodiments, the connectivity module 208 also permits secure pairing, discovery and advertisement, registration, and authorization with the cloud resources 106.

The bootstrap module 210 may perform a selected platform transformation build on the computing device 102 to transform the current platform to the selected platform. In some embodiments, the bootstrap module 210 uses the platform transformation data 156 to effect the platform transformation. To do so, in some embodiments, the bootstrap module 210 may facilitate the secure retrieval of data from the cloud resources 106. The communication module 212 may handle the communication between the computing device 102 and remote computing devices (e.g., devices with the cloud resources 106) through the network 104. Each of the trusted virtual platform environment 202, the platform management module 204, the context module 206, the connectivity module 208, the bootstrap module 210, and the communication module 212 may be embodied as hardware, software, firmware, or a combination thereof.

Figure 3:
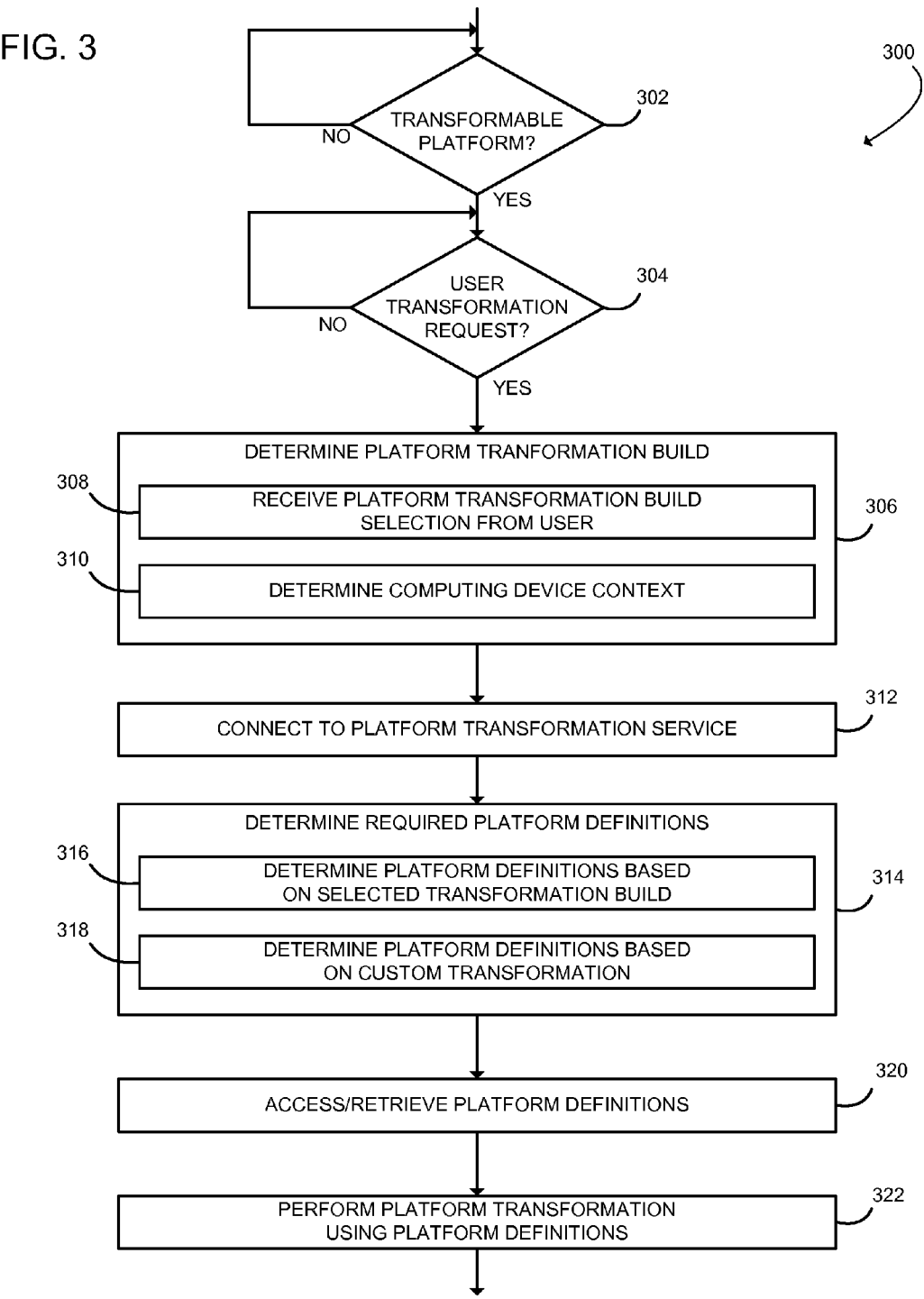
FIG. 3 is a simplified flow diagram of at least one embodiment of a method for transforming a platform of a computing device of the system of FIG. 1 in response to a user request.

Referring now to FIG. 3, in use, the computing device 102 may execute a method 300 for transforming a platform of the computing device 102 in response to a user request. The method 300 begins with block 302 in which the computing device 102 determines whether the platform of the computing device 102 is transformable. In some embodiments, the computing device 102 is transformable if it includes at least one transformable component 124. If the computing device 102 determines the computing device 102 is transformable, the computing device 102 waits until a user transformation request has been received from the user of the computing device 102 in block 304.

If a user prompts the computing device 102 to transform the platform, the computing device 102 determines the appropriate platform transformation build in block 306. For example, in block 308, the computing device 102 determines the platform transformation build selection received from the user. For example, the user may access a software or web-based application and select a desired platform build via a graphical user interface. In some embodiments, the user may select the platform transformation build 150 using the computing device 102. However, in other embodiments, the user may select the platform transformation build 150 from a different computing device (e.g., using a remote computing via a web-based application). Such an embodiment of the system 100 may be used, for example, by parents to transform their children's computing devices 102 into a platform without entertainment options during school nights (e.g., into an alarm clock). In some embodiments, a user of the computing device 102 may select a custom platform transformation build 150. That is, in some embodiments, the user may request the current platform of the computing device 102 to be transformed into a pre-configured or pre-established platform transformation build 150 within the cloud resources 106. In other embodiments, the user may request the current platform to be transformed into a platform build for which the cloud resources 106 do not have a pre-configured platform transformation build 150. In some embodiments, the computing device 102 may also determine the context of the computing device 102 in block 310. For example, the computing device 102 may determine its current architecture (e.g., hardware, software, and firmware make-up) for use in the platform transformation as discussed below. In block 312, the computing device 102 may establish a communication connection with a platform transformation service (e.g., within the cloud resources 106).

In block 314, the computing device 102 determines the platform definitions 154 required to effect the selected platform transformation build 150. If the computing device 102 determines that the user did not select a custom transformation (i.e., the user selected a pre-configured platform transformation build 150), the computing device determines and retrieves the platform definitions 154 from the cloud resources 106 based on the selected platform transformation build 150 in block 316. In some embodiments, the computing device 102 may store one or more of the platform transformation builds 150 in the memory 112 or the data storage 122 of the computing device 102. Similarly, in some embodiments, the computing device 102 may store one or more platform definitions 154 and/or platform transformation data 156 in the memory 112 or the data storage 122. In such embodiments, the computing device 102 may simply access the relevant platform transformation builds 150, platform definitions 154, and/or platform transformation data 156 from the memory 112 and/or the data storage 122 rather than retrieve it from the cloud resources 106. If, however, the computing device 102 determines that the user selected a custom platform transformation, the computing device 102 determines and retrieves the required platform definitions 154 based on the identified custom platform transformation build in block 318. In some embodiments, the computing device 102 may utilize one or more platform transformation services 152 of the cloud resources 106 in determining the required platform definitions 154 for the customized platform transformation build.

In block 320, the computing device 102 retrieves the identified platform definitions 154 from the cloud resources 106 and, in block 322, the computing device 102 performs the platform transformation using the retrieved platform definitions 154.

Figure 5:
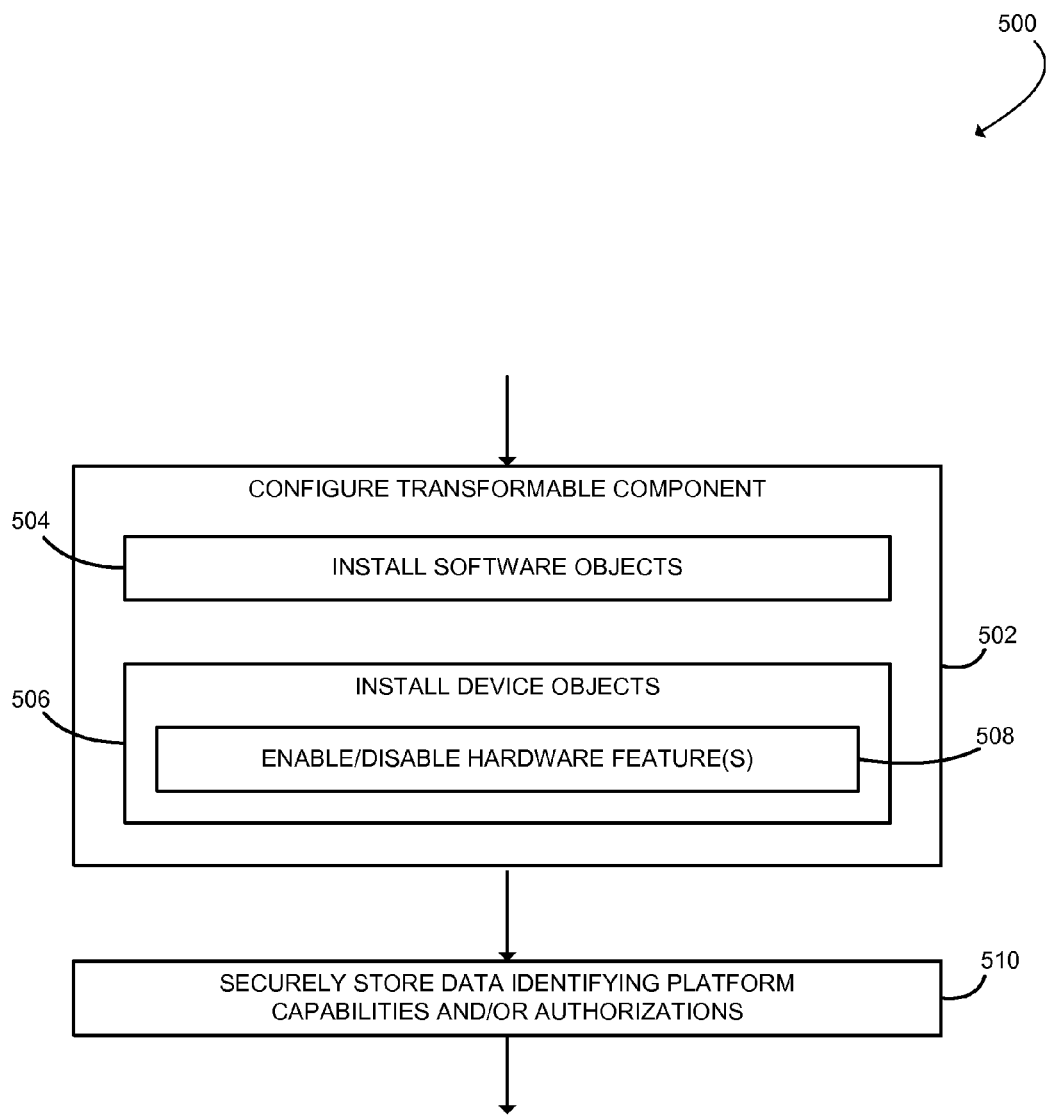
FIG. 5 is a simplified flow diagram of at least one embodiment of a method for performing a platform transformation build on a computing device of the system of FIG. 1.

The computing device 102 may perform the platform transformation by executing a method 500 as shown in FIG. 5. The method 500 begins with block 502 in which the computing device 102 configures one or more of the transformable components 124 of the computing device 102 using the platform definitions 154. In doing so, the computing device 102 may retrieve the platform transformation data 156 identified by the platform definitions 154 from the cloud resources 106 or from the memory 112 or the data storage 122 of the computing device 102. Further, in some embodiments, the computing device 102 installs identified software objects 160 (e.g., configures firmware and/or software of the computing device 102) in block 504. In block 506, the computing device 102 installs identified device objects 158 (e.g., configures a transformable component 124 of the computing device 102). In doing so, in block 508, the computing device 102 may enable and/or disable one or more hardware features 126 of the computing device 102. In some embodiments, the computing device 102 may do so by configuring the transformable components 124. In some embodiments, the computing device 102 may perform the platform transformation by reformatting at least a portion of the memory 112 and/or the data storage 122 with the new transformable device configuration. In other embodiments, virtualization may be used to perform the platform transformation. In yet other embodiments, any suitable mechanisms for configuring the transformable components 124 and otherwise performing the platform transformation may be used.

In some embodiments, the computing device 102 may securely store data identifying the platform capabilities and/ or platform authorizations in block 510. In some embodiments, the computing device 102 may store data regarding the platform prior to the transformation and/or data regarding the new platform. For example, the computing device 102 may store data indicating the gamut of capabilities (e.g., hardware features) of the computing device 102. Such data may indicate, among other things, the amount of data storage, the memory characteristics, the processor speed, available sensors and peripheral devices, and specific data regarding various transformable components. In some embodiments, data regarding each platform the computing device 102 is authorized to transform into is stored (e.g., in the secure memory 114) such that the cloud resources 106 may verify such authorization(s) of the computing device 102. For example, as discussed above, a user of the computing device 102 may have purposed an all-inclusive line of computing device 102 but only purchased two platforms (e.g., gaming computer and digital picture frame). In such an embodiment, the computing device 102 may store data indicating that the computing device 102 is authorized to transform into the gaming computing and the digital picture frame. In other embodiments, authorization data such as data indicating authorized platform transformations may be stored on the cloud resources 106. It should also be appreciated that the computing device 102 may verify authorized platform transformations at one or more stages in the platform transformation process (e.g., at block 304 of FIG. 3).

Figure 4:
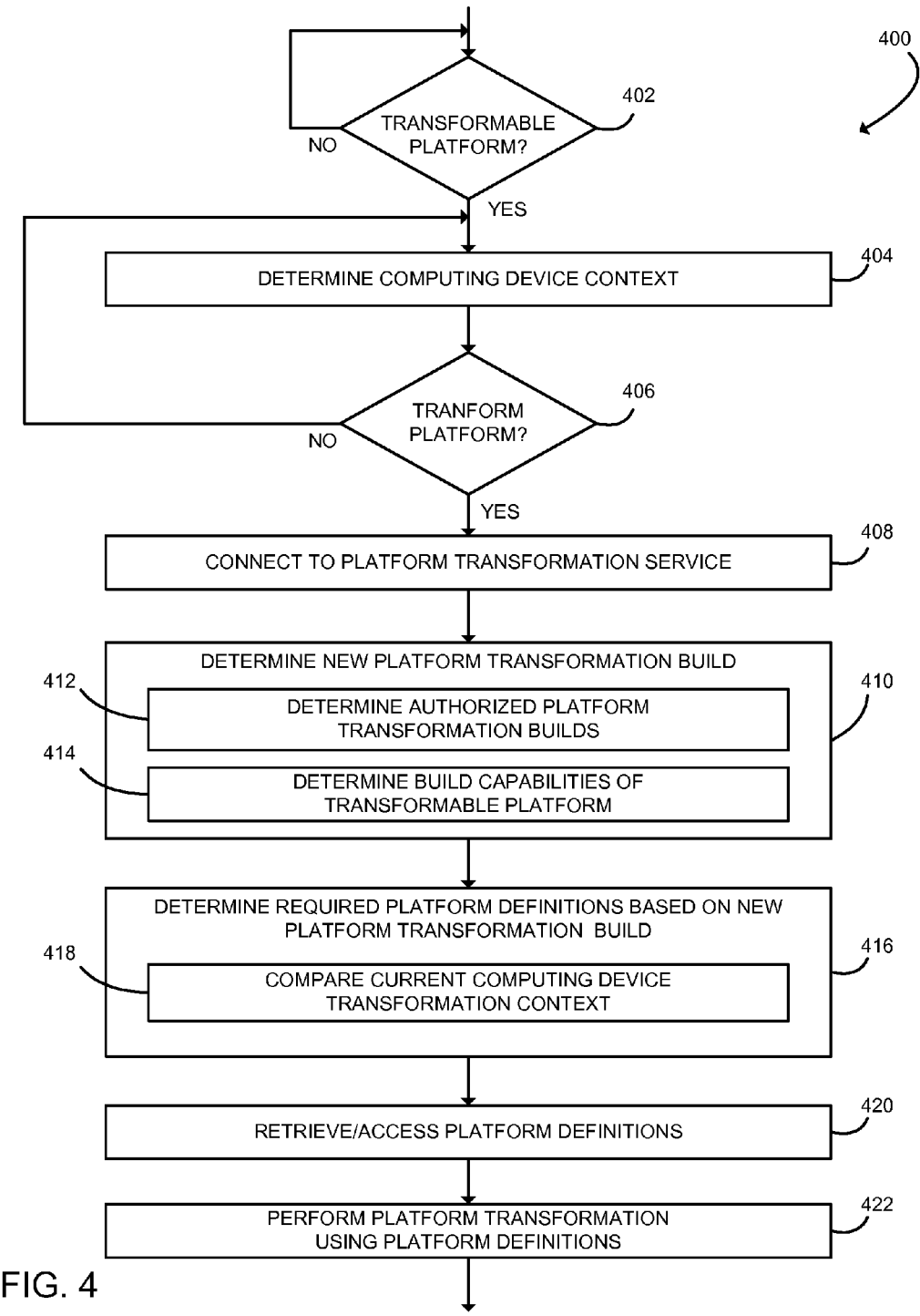
FIG. 4 is a simplified flow diagram of at least one embodiment of a method for dynamically transforming a platform of a computing device of the system of FIG. 1.

Referring now to FIG. 4, an illustrative embodiment of a method 400 for dynamically transforming a platform of the computing device 102, which may be executed by the computing device 102, begins with block 402. In block 402, the computing device 102 determines whether the platform of the computing device 102 is transformable. If so, the computing device 102 determines the context of the computing device 102 in block 404. As discussed above, the context may include the architecture of the computing device 102, the physical environment context as indicated by the sensors 120, and/or a user-related context.

In block 406, the computing device 102 determines whether to transform the platform of the computing device 102. In some embodiments, the user may establish or designate a condition to trigger the platform transformation. For example, as indicated above, the user may want the computing device 102 to transform its platform as the computing device 102 is moved from one location to another (e.g., office to home) as illustrated and explained above in reference to FIG. 6. In another embodiment, the computing device 102 may use pre-established conditions. For example, the platform transformation builds 150, the platform definitions 154, or the platform transformation data 156 may indicate conditions for transformation in some embodiments. It should be appreciated that the computing device 102 may have more than one platform transformation condition in any given platform. For example, as illustrated and explained in reference to FIG. 6, the picture frame 608 may transform into a vehicle infotainment system 610 or a desktop computer 612 based on the occurrence of two different conditions associated with geographical location. It should further be appreciated that a particular condition may be a function of multiple sensor 120 outputs. If a platform transformation condition is not satisfied, the method 400 returns to block 404 in which the computing device 102 determines (e.g., refreshes) the computing device 102 context. If, however, a platform transformation condition is satisfied, the computing device 102 may establish a communication connection with the platform transformation service 152 in block 408. As discussed above, in some embodiments, the computing device 102 may store platform transformation builds 150, platform definitions 154, platform transformation data 156, platform transformation capabilities, and/or authorized platform transformation data in the memory 112 or the data storage 122.

In block 410, the computing device 102 determines the new platform transformation build. In doing so, in some embodiments, the computing device 102 may determine authorized platform transformation builds in block 412. That is, the computing device 102 may determine which platform transformation builds the current platform of the computing device 102 is authorized to transform into. As indicated above, in some embodiments, authorized builds may based, for example, on those builds purchased by the user. Additionally, in some embodiments, the computing device 102 may determine the build capabilities of the transformable platform or the computing device 102 generally. For example, the computing device 102 may assess the hardware, software, and/or firmware of the computing device 102 to determine which platforms are capable of being supported (i.e., transformed into) by the current computing device 102 architecture. It should be appreciated that in some embodiments the computing device 102 may determine authorized platform transformation builds and/or build capabilities prior to determining whether to transform the platform in block 406.

In block 416, the computing device 102 determines the platform definitions 154 required to perform the new platform transformation. As indicated above, in doing so, the computing device 102 may use the platform transformation services 152. Additionally, in some embodiments, the computing device 102 may compare the context of the current computing device 102 (e.g., the current architecture) to the platform definitions 154 and/or platform transformation data 156 required by the new platform transformation build in block 418. That is, in some embodiments, the computing device 102 may only need to modify a portion of the platform to result in the new platform transformation build. In block 420, the computing device 102 may retrieve or access the required platform definitions 154. In block 422, the computing device 102 performs the platform transformation by executing the method 500 as discussed above.

As such, the systems, devices, methods, and other technologies disclosed herein facilitate the transformation of the transformable platform of the computing device 102 from one hardware configuration to another (i.e., the computing device 102 is transformable from one type or purpose to another). It should be appreciated that, in some embodiments, the transformable platform includes hardware which may be abstractly viewed as nodes in a composition graph. That is, one or more hardware (or nodes) is enabled (i.e., turned on), disabled, linked, and/or unlinked to create new platform functionality or remove old platform functionality. Additionally, the software/firmware of the computing device 102 interconnects the hardware/nodes in the composition graph by handling the operations and/or control mechanisms associated with the new/old hardware functionality. As such, in some embodiments, the software/firmware of the computing device 102 may be modified to facilitate the functionality of the hardware transformation.

EXAMPLES

Illustrative examples of the devices, systems, and methods disclosed herein are provided below. An embodiment of the devices, systems, and methods may include any one or more, and any combination of, the examples described below.

Example 1 includes a computing device for performing a platform transformation, the computing device comprising a transformable component having a plurality of hardware features, the transformable component transformable into a first configuration in which a first set of the plurality of hardware features is enabled such that the computing device has a first capability and transformable into a second configuration in which a second set of the plurality of hardware features, different from the first set, is enabled such that the computing device has a second capability different from the first capability; a platform management module to determine a platform transformation build that identifies one of the first capability and the second capability of the computing device; a connectivity module to (i) establish a communication connection with a cloud-based platform transformation service, (ii) determine at least one platform definition required to perform the determined platform transformation build, the platform definition including platform transformation data usable to transform the transformable component between the first configuration and the second configuration, and (iii) retrieve the at least one platform definition from the cloud-based platform transformation service; and a bootstrap module to perform the platform transformation build using the at least one platform definition to transform the transformable component between the first configuration and the second configuration.

Example 2 includes the subject matter of Example 1, and further including a context module to determine a context of the computing device, wherein the platform management module is to determine the platform transformation build as a function of the context of the computing device.

Example 3 includes the subject matter of any of Examples 1 and 2, and wherein the context of the computing device comprises an architecture of a current platform of the computing device.

Example 4 includes the subject matter of any of Examples 1-3, and wherein the context module is to determine the context of the computing device by determining at least one of: a context of a user of the computing device, and a surrounding physical environment of the computing device.

Example 5 includes the subject matter of any of Examples 1-4, and wherein the context module is to determine the context of the computing device as a function of sensor data received from at least one sensor of the computing device.

Example 6 includes the subject matter of any of Examples 1-5, and wherein the connectivity module is to establish the communication connection with the cloud-based platform transformation service in response to the sensor data satisfying a pre-established condition for transforming the platform.

Example 7 includes the subject matter of any of Examples 1-6, and wherein the platform management module is to determine a platform transformation build associated with an occurrence of the pre-established condition.

Example 8 includes the subject matter of any of Examples 1-7, and wherein the platform management module is to determine the platform transformation build as a function of a platform transformation request of a user of the computing device.

Example 9 includes the subject matter of any of Examples 1-8, and wherein the computing device has a first purpose when the transformable component is in the first configuration and a second purpose, different from the first purpose, when the transformable component is in the second configuration.

Example 10 includes the subject matter of any of Examples 1-9, and wherein the first purpose is defined by the first capability and the second purpose is defined by the second capability.

Example 11 includes the subject matter of any of Examples 1-10, and wherein the computing device is of a first type of computing device when the transformable component is in the first configuration and a second type of computing device, different from the first type of computing device, when the transformable component is in the second configuration.

Example 12 includes the subject matter of any of Examples 1-11, and wherein the bootstrap module is to perform the platform transformation build by installing at least one software object that configures one of software and firmware of the computing device and is identified by the at least one platform definition retrieved by the connectivity module.

Example 13 includes the subject matter of any of Examples 1-12, and wherein the bootstrap module is to perform the platform transformation build by installing at least one device object that configures a device of the computing device and is identified by the at least one platform definition retrieved by the connectivity module.

Example 14 includes the subject matter of any of Examples 1-13, and wherein the device is the transformable component.

Example 15 includes the subject matter of any of Examples 1-14, and wherein the bootstrap module is further to securely store data identifying at least one of (i) the first capability and the second capability and (ii) one or more authorized platform transformation builds.

Example 16 includes the subject matter of any of Examples 1-15, and wherein the connectivity module is to determine the at least one platform definition by comparing a current platform build of the computing device to the platform transformation build determined by the platform management module.

Example 17 includes a method for transforming a platform of a computing device, the method comprising determining, using the computing device, a platform transformation build that identifies one of a first capability of the computing device and a second capability of the computing device different from the first capability; establishing, using the computing device, a communication connection with a cloud-based platform transformation service; determining, using the computing device, at least one platform definition required to perform the determined platform transformation build, the platform definition including platform transformation data usable to transform a transformable component of the computing device from a first configuration in which a first set of a plurality of hardware features is enabled such that the computing device has the first capability to a second configuration in which a second set of the plurality of hardware features, different from the first set, is enabled such that the computing device has the second capability; retrieving, with the computing device, the at least one platform definition from the cloud-based platform transformation service; and performing, using the computing device, the platform transformation build to transform the transformable component between the first configuration and the second configuration.

Example 18 includes the subject matter of Example 17, and further including determining, using the computing device, a context of the computing device, wherein determining the platform transformation build comprises determining a platform transformation build as a function of the context of the computing device.

Example 19 includes the subject matter of any of Examples 17 and 18, and wherein determining the context of the computing device comprises determining an architecture of a current platform of the computing device.

Example 20 includes the subject matter of any of Examples 17-19, and wherein determining the context of the computing device comprises determining a context of a user of the computing device and a surrounding physical environment of the computing device.

Example 21 includes the subject matter of any of Examples 17-20, and wherein determining the computing device context comprises determining a computing device context as a function of sensor data from at least one sensor of the computing device.

Example 22 includes the subject matter of any of Examples 17-21, and wherein establishing the communication connection comprises establishing the communication connection in response to the sensor data satisfying a pre-established condition for transforming the platform.

Example 23 includes the subject matter of any of Examples 17-22, and wherein determining the platform transformation build comprises determining a platform transformation build associated with an occurrence of the pre-established condition.

Example 24 includes the subject matter of any of Examples 17-23, and wherein determining the platform transformation build comprises determining a platform transformation build as a function of a platform transformation request of a user of the computing device.

Example 25 includes the subject matter of any of Examples 17-24, and wherein performing the platform transformation build comprises installing at least one software object that configures one of software and firmware of the computing device and is identified by the at least one retrieved platform definition.

Example 26 includes the subject matter of any of Examples 17-25, and wherein performing the platform transformation build comprises installing at least one device object that configures a device of the computing device and is identified by the at least one retrieved platform definition.

Example 27 includes the subject matter of any of Examples 17-26, and wherein performing the platform transformation build comprises installing at least one device object that configures the transformable component of the computing device.

Example 28 includes the subject matter of any of Examples 17-27, and further including securely storing data on the computing device identifying at least one of (i) the first capability and the second capability and (ii) one or more authorized platform transformation builds.

Example 29 includes the subject matter of any of Examples 17-28, and wherein determining the at least one platform definition comprises comparing a current platform build of the computing device to the determined platform transformation build.

Example 30 includes a computing device comprising a processor; and a memory having stored therein a plurality of instructions that when executed by the processor cause the computing device to perform the method of any of Examples 17-29.

Example 31 includes one or more machine readable storage media comprising a plurality of instructions stored thereon that in response to being executed result in a computing device performing the method of any of Examples 17-29.

The invention claimed is:

1. A computing device for performing a platform transformation, the computing device comprising:
a transformable component having a plurality of hardware features, the transformable component transformable into a first configuration in which a first set of the plurality of hardware features is enabled such that the computing device has a first capability and transformable into a second configuration in which a second set of the plurality of hardware features, different from the first set, is enabled such that the computing device has a second capability different from the first capability;
a platform management module to determine a platform transformation build that identifies one of the first capability and the second capability of the computing device;
a connectivity module to (i) establish a communication connection with a cloud-based platform transformation service, (ii) determine at least one platform definition required to perform the determined platform transformation build, the platform definition including platform transformation data usable to transform the transformable component between the first configuration and the second configuration, and (iii) retrieve the at least one platform definition from the cloud-based platform transformation service; and
a bootstrap module to perform the platform transformation build using the at least one platform definition to transform the transformable component between the first configuration and the second configuration.

2. The computing device of claim 1, further comprising a context module to determine a context of the computing device, wherein the platform management module is to determine the platform transformation build as a function of the context of the computing device.

3. The computing device of claim 2, wherein the context module is to determine the context of the computing device as a function of sensor data received from at least one sensor of the computing device.

4. The computing device of claim 3, wherein the connectivity module is to establish the communication connection with the cloud-based platform transformation service in response to the sensor data satisfying a pre-established condition for transforming the platform.

5. The computing device of claim 4, wherein the platform management module is to determine a platform transformation build associated with an occurrence of the pre-established condition.

6. The computing device of claim 1, wherein the platform management module is to determine the platform transformation build as a function of a platform transformation request of a user of the computing device.

7. The computing device of claim 1, wherein the computing device has a first purpose when the transformable component is in the first configuration and a second purpose, different from the first purpose, when the transformable component is in the second configuration, the first purpose being defined by the first capability and the second purpose being defined by the second capability.

8. The computing device of claim 1, wherein the bootstrap module is to perform the platform transformation build by installing at least one software object that configures one of software and firmware of the computing device and is identified by the at least one platform definition retrieved by the connectivity module.

9. The computing device of claim 1, wherein the bootstrap module is to perform the platform transformation build by installing at least one device object that configures the transformable component of the computing device and is identified by the at least one platform definition retrieved by the connectivity module.

10. One or more machine readable storage media comprising a plurality of instructions stored thereon that, in response to being executed, result in a computing device:

determining a platform transformation build that identifies one of a first capability of the computing device and a second capability of the computing device different from the first capability;

establishing a communication connection with a cloud-based platform transformation service;

determining at least one platform definition required to perform the determined platform transformation build, the platform definition including platform transformation data usable to transform a transformable component of the computing device from a first configuration in which a first set of a plurality of hardware features is enabled such that the computing device has the first capability to a second configuration in which a second set of the plurality of hardware features, different from the first set, is enabled such that the computing device has the second capability;

retrieving the at least one platform definition from the cloud-based platform transformation service; and performing the platform transformation build to transform the transformable component between the first configuration and the second configuration.

11. The one or more machine readable storage media of claim 10, wherein the plurality of instructions further result in the computing device determining a context of the computing device, wherein determining the platform transformation build comprises determining a platform transformation build as a function of the context of the computing device.

12. The one or more machine readable storage media of claim 11, wherein determining the computing device context comprises determining a computing device context as a function of sensor data from at least one sensor of the computing device.

13. The one or more machine readable storage media of claim 12, wherein establishing the communication connection comprises establishing the communication connection in response to the sensor data satisfying a pre-established condition for transforming the platform.

14. The one or more machine readable storage media of claim 13, wherein determining the platform transformation build comprises determining a platform transformation build associated with an occurrence of the pre-established condition.

15. The one or more machine readable storage media of claim 10, wherein determining the platform transformation build comprises determining a platform transformation build as a function of a platform transformation request of a user of the computing device.

16. The one or more machine readable storage media of claim 10, wherein performing the platform transformation build comprises installing at least one device object that configures the transformable component of the computing device and is identified by the at least one retrieved platform definition.

17. A method for transforming a platform of a computing device, the method comprising:

determining, using the computing device, a platform transformation build that identifies one of a first capability of the computing device and a second capability of the computing device different from the first capability;

establishing, using the computing device, a communication connection with a cloud-based platform transformation service;

determining, using the computing device, at least one platform definition required to perform the determined platform transformation build, the platform definition including platform transformation data usable to transform a transformable component of the computing device from a first configuration in which a first set of a plurality of hardware features is enabled such that the computing device has the first capability to a second configuration in which a second set of the plurality of hardware features, different from the first set, is enabled such that the computing device has the second capability;

retrieving, with the computing device, the at least one platform definition from the cloud-based platform transformation service; and performing, using the computing device, the platform transformation build to transform the transformable component between the first configuration and the second configuration.

18. The method of claim 17, further comprising determining, using the computing device, a context of the computing device, wherein determining the platform transformation build comprises determining a platform transformation build as a function of the context of the computing device.

19. The method of claim 17, wherein determining the platform transformation build comprises determining a platform transformation build as a function of a platform transformation request of a user of the computing device.

20. The method of claim 17, wherein performing the platform transformation build comprises installing at least one device object that configures the transformable component of the computing device and is identified by the at least one retrieved platform definition.

* * * * *